US012775719B2

(12) United States Patent
Stilwell et al.

(10) Patent No.: US 12,775,719 B2
(45) Date of Patent: Oct. 27, 2026

(54) APPARATUS AND METHODS FOR PROVIDING PRIVILEGED ACCESS TO SOFTWARE CONTAINERS

(71) Applicant: INTERNATIONAL BUSINESS MACHINES CORPORATION, Armonk, NY (US)

(72) Inventors: Brad Stilwell, Poughkeepsie, NY (US); Marie R Buzzetti, Pleasant Valley, NY (US); Neil Alan Johnson, Cornwall, NY (US); Deborah A. Furman, Staatsburg, NY (US); Kershaw S. Mehta, Poughkeepsie, NY (US); Samuel Turner, Beacon, NY (US); Nick Marasco, Poughkeepsie, NY (US); Latia Tanner, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/617,812

(22) Filed: Mar. 27, 2024

(65) Prior Publication Data

US 2025/0307434 A1 Oct. 2, 2025

(51) Int. Cl.
*G06F 21/60* (2013.01)
*G06F 9/455* (2018.01)

(52) U.S. Cl.
CPC ........ *G06F 21/604* (2013.01); *G06F 9/45558* (2013.01); *G06F 2009/45562* (2013.01); *G06F 2221/2141* (2013.01)

(58) Field of Classification Search
CPC ............... G06F 21/604; G06F 9/45558; G06F 2009/45562; G06F 2221/2141

(Continued)

(56) References Cited

U.S. PATENT DOCUMENTS 7,120,932 B2 10/2006 Lockhart et al.
7,836,080 B2 11/2010 DeBie (Continued)

FOREIGN PATENT DOCUMENTS

EP 4030286 A1 7/2022
WO 2022177776 A1 8/2022

OTHER PUBLICATIONS

Vivek Vijay Sarkale, "Secure Cloud Container: Runtime Behavior Monitoring using Most Privileged Container (MPC)" 2017 IEEE (Year: 2017).*

(Continued)

*Primary Examiner* — Samson B Lemma
(74) *Attorney, Agent, or Firm* — Onyx IP Group

(57) ABSTRACT

A computing system includes a processing device that executes computer program instructions stored in memory that, when executed, cause the processing device to, in response to a request to initiate a software container in a container runtime environment, access a centralized security database that includes for at least one user, data representing one or more container privileges for operations required to run applications in software containers on a computing system. The computing system verifies that a user associated with the request has been granted permission to initiate a software container based on the data representing one or more container privileges identified in the centralized security database. In response to verifying that the user has been granted permission to initiate the software container, the software container is allowed to start by permitting use of associated operations required to run applications in the software container.

20 Claims, 5 Drawing Sheets

(58) Field of Classification Search
USPC .............................................................. 726/27
See application file for complete search history.

(56) References Cited

U.S. PATENT DOCUMENTS

| | | | | |
|---|---|---|---|---|
| 8,468,548 | B2 | 6/2013 | Kulkarni et al. | |
| 10,691,816 | B2 * | 6/2020 | Aronovich | G06F 16/24552 |
| 10,909,165 | B2 * | 2/2021 | Eder | G06F 16/51 |
| 11,275,861 | B2 * | 3/2022 | Neitzel | G06F 21/6218 |
| 11,757,636 | B2 * | 9/2023 | Elmenshawy | H04L 63/0807 713/159 |
| 11,811,679 | B2 * | 11/2023 | Elmenshawy | G06F 21/44 |
| 11,979,422 | B1 * | 5/2024 | Kapoor | G06F 21/554 |
| 12,468,830 | B2 * | 11/2025 | Neitzel | G06F 21/6218 |
| 2014/0047272 | A1 * | 2/2014 | Breternitz | G06F 11/3414 714/E11.177 |
| 2014/0047342 | A1 * | 2/2014 | Breternitz | G06F 9/5061 715/735 |
| 2016/0134596 | A1 * | 5/2016 | Kovacs | H04L 63/0876 726/7 |
| 2018/0165183 | A1 * | 6/2018 | Kremp | G06F 21/6218 |
| 2019/0266604 | A1 * | 8/2019 | Desai | G06Q 30/06 |
| 2019/0273744 | A1 * | 9/2019 | Goel | G06F 9/468 |
| 2021/0173933 | A1 * | 6/2021 | Mohinder | G06F 21/57 |
| 2021/0409218 | A1 * | 12/2021 | Elmenshawy | H04L 9/16 |
| 2021/0409345 | A1 * | 12/2021 | Elmenshawy | G06F 21/44 |
| 2023/0403306 | A1 * | 12/2023 | Chen | H04L 63/102 |
| 2024/0080277 | A1 * | 3/2024 | Lee | H04L 67/60 |
| 2024/0134678 | A1 * | 4/2024 | Turim | G06F 9/45558 |
| 2024/0220639 | A1 * | 7/2024 | Sahu | G06F 21/602 |

OTHER PUBLICATIONS

Eric Chiang (CoreOS), "Using RBAC, Generally Available in Kubernetes v1.8" Oct. 28, 2017.*

Kunal Verma, "Navigating the Kubernetes Architecture—A Comprehensive Guide" Updated Oct. 2, 2023.*

* cited by examiner

APPARATUS AND METHODS FOR PROVIDING PRIVILEGED ACCESS TO SOFTWARE CONTAINERS

BACKGROUND

The present disclosure relates to methods, apparatus, and products for providing privileged access to software containers.

SUMMARY

According to embodiments of the present disclosure, various methods, apparatus and products for providing privileged access to software containers are described herein. In some aspects, a computing system includes a processing device that executes computer program instructions stored in memory that, when executed, cause the processing device to, in response to a request to initiate a software container in a container runtime environment, access a centralized security database that includes for at least one user, data representing one or more container privileges for operations required to run applications in software containers on a computing system. The computing system verifies that a user associated with the request has been granted permission to initiate a software container based on the data representing one or more container privileges identified in the centralized security database. In response to verifying that the user has been granted permission to initiate the software container, the software container is allowed to start by permitting use of associated operations required to run applications in the software container.

DETAILED DESCRIPTION

Figure 1:
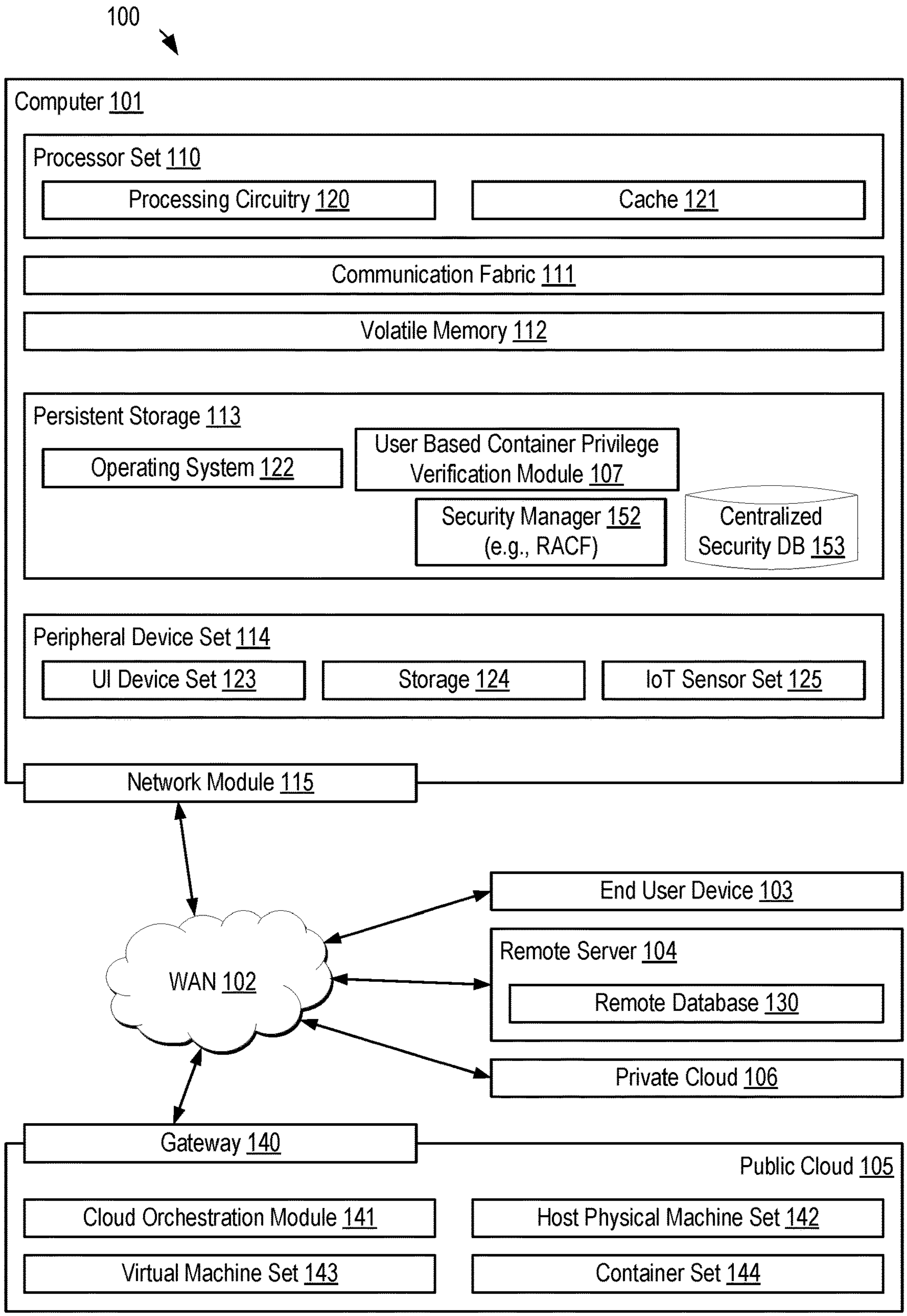
FIG. 1 sets forth an example computing environment according to aspects of the present disclosure.

Software containers allow the packaging of applications and its dependencies together in order to easily and reliably run them in other environments. Containers are executable units of software in which application code is packaged along with its libraries and dependencies, in common ways so that the code can be run anywhere, whether it be on desktop or the cloud. Containers share the machine operating system (OS) kernel, eliminating the need for a full OS instance per application and making container files small and easy on resources. One key aspect of containers is the ability to isolate the environment the application runs in from other applications, using technologies such as namespaces. On some platforms, containers may not be completely locked down, and could have access to host functions. Even on platforms where containers are completely isolated, there are frequently security vulnerabilities that allow a user to break out of the container and access host functions.

It may be desirable to completely lock down access in a container, but still require limited privileged access inside the container. On Linux, this is typically done with the use of user namespaces and capabilities, whereby a user can have privileged access inside the container, while still maintaining non-privileged access outside the container. This model uses a decentralized method to provide privileged access and does not give an easy way for an administrator to completely lock down access in the container.

Some computing systems also employ security servers that use security managers, such as external security managers such as an IBM Resource Access Control Facility (RACF®) for z/OS® which is a security software product, such as a security kernel of the z/OS security server environment available from IBM Corporation, Armonk, New York, that enables the protection of mainframe resources by making access control decisions for users through a suitable interface or series of interfaces such as application programming interfaces (APIs), or other suitable interface. The security manager protects system resources by granting access only to authorized users of the protected resources. The security manager retains authorization information about users and resources, in access authorization data structures called profiles in its database, and the security manager refers to these profiles when deciding which users should be permitted access to protected system resources. Major subsystems such as Db2® can use the facilities of RACF to protect transactions and files. However, there is no user level software container access privilege capability provided by such systems.

As disclosed herein, a centralized policy of container governance is used, in which a user still maintains non-privileged access outside of a container, while having limited privileged access inside of a container if permitted to the policy by the system administrator. This centralized method allows an administrator to easily permit and remove access to the policy while maintaining the integrity of user access both inside and outside of the container. The starting or running of containers is enabled for specific users of the computing system.

In some implementations, a single governance policy is used to permit limited privileged access when running in a container. In contrast, other platforms, such as Linux, use user namespaces and capabilities that allow granular access to privileged function. While granular access can give added flexibility, it can make it more difficult to manage appropriately for administrators.

As disclosed herein, using a single governance policy results in a simplified, global switch, that allows an administrator to give or restrict limited privileged access when running in containers. In some implementations, as part of an initial setup, a system administrator through a user interface provided on an administrator device, grants appropriate privileges through a centralized security database. In some examples, the granted privileges are for operations needed to run a container. When an end user requests to initiate a software container to a container runtime service of the computing system, a check is first done with the centralized security database to verify that the user has been given the appropriate privileges to start a container. If the user has been given the appropriate privileges, the software container is started by the container runtime service.

As disclosed herein, in one example, limited privileges that are granted for container access include: mounting of special filesystems needed for containers, ability to create namespaces, access to container networking technology and ability to change root (change scope of file system) when running inside a container. If a user does not have access to the resource that provides these multiple privileges, then the user is not permitted to use any of the technologies that are key to containers. Access is prevented by default, and explicit action is needed by the administrator to permit a user to run the container.

With reference now to FIG. 1, FIG. 1 sets forth an example computing environment according to aspects of the present disclosure. Computing environment 100 contains an example of an environment for the execution of at least some of the computer code involved in performing the various methods described herein, such as a user based container privilege verification module 107, such as stored program code that when executed provides privileged access to software containers. In addition to user based container privilege verification module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and user based container privilege verification module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in user based container privilege verification module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the user based container privilege verification module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
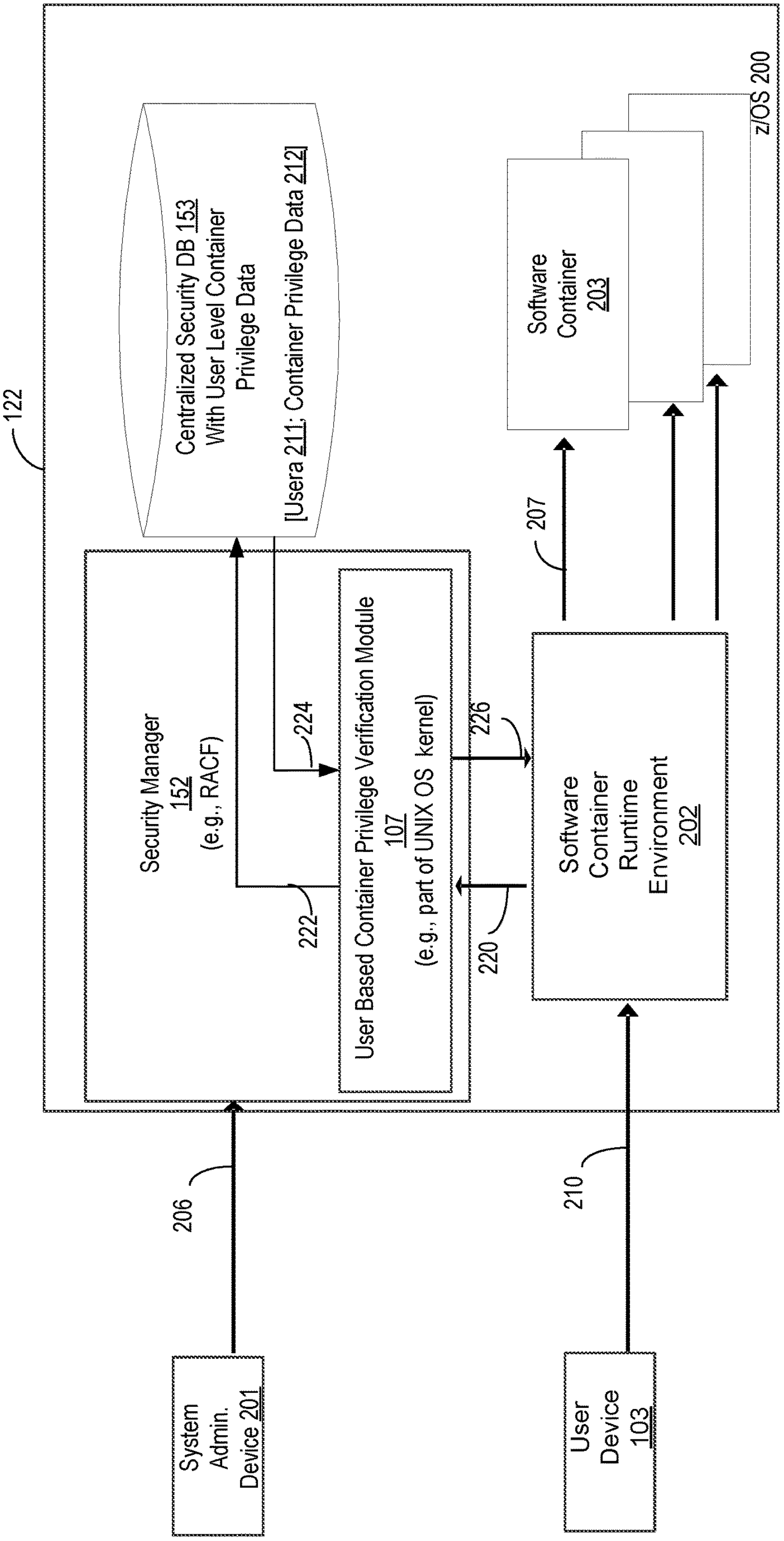
FIG. 2 sets forth an example computing system that provides privileged access to software containers according to aspects of the present disclosure.

Referring to FIG. 2, FIG. 2 sets forth an example computing environment using a computer 101, such as a mainframe computer, that provides privileged access to software containers according to aspects of the present disclosure. In this example, a security server includes the security manager 152 and associated centralized security manager database 153 as part of an RACF operating in a z/OS environment 200. In this example, an operating system 122 includes the user based container privilege verification module 107 as part of the security manager 152 and interfaces with a software container runtime environment 202 also referred to as a software container runtime service. However, the operations described herein may be implemented in any suitable environment and may be incorporated into any suitable component as desired. The arrows illustrate communication paths among the components, such as communication buses, service calls, API calls, or any suitable communication mechanism. Also in this example, the centralized security database 153 is also referred to as the centralized security manager database 153 that includes a user profile database that includes user profiles indexed by user identifiers that contain data representing, inter alia, a user identifier and container privilege data for a user and hence container use privilege is set at a user level. As used herein a user also includes a group of users as desired. For example, in some implementations, the container privilege data is set in the centralized security database to apply to a group of users.

The computing system environment includes a system administrator device 201, such as a computing device or terminal that provides a user interface that allows a system administrator to grant users in the system container privileges. For example, the system administrator grants privileges to users of the system through a grant container privilege command 206 through the security manager 152. The grant container privilege command 206 is associated with a user and is understood by the security manager 152 to set user level privilege data 212 for a user. The grant container privilege command 206 provides permission for the user to have access to certain operations of the container runtime service 202 that containers need to run. In one example, as applied to an IBM z/OS® system, the grant container privilege command is implemented as a UNIXPRIV resource such as UNIXPRIV.CONTAINERS, in a UNIXPRIV class that configures the system to grant users privilege access while running in a container, but not grant such access when running outside of a container as further described herein.

Based on the grant container privilege command 206, the security manager 152 stores the user level container privilege data 212 for a user in the centralized security manager database 153. The computing system environment 100 includes the user based container privileged verification module 107 as well as the software container runtime environment 202 and software containers 203 that are started as shown by arrow 207 by the software container runtime environment 202 when a user is has the privilege(s) set in the centralized security database 153 that permit initiation of the containers.

Figure 3:
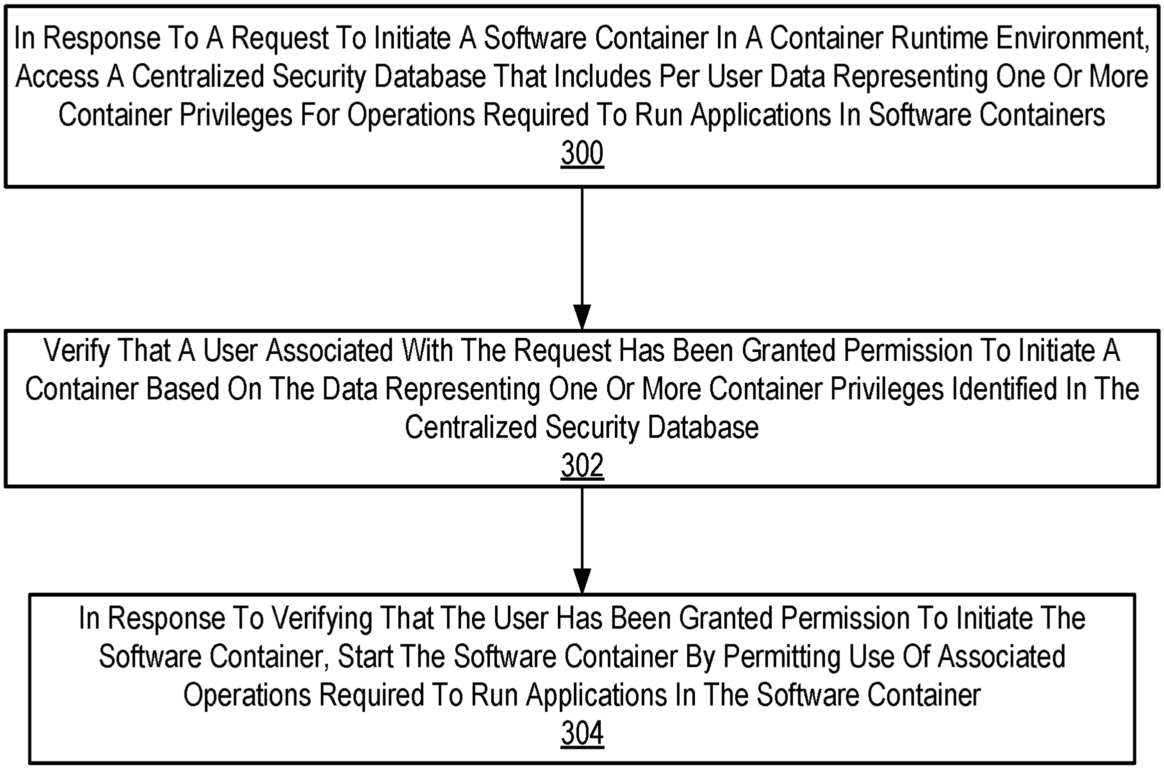
FIG. 3 sets forth a flowchart of an example process for providing privileged access to software containers according to aspects of the present disclosure.

Referring also to FIG. 3, FIG. 3 sets forth a flowchart of an example process for providing privileged access to software containers. As part of an initial setup, a system administrator through a user interface provided on the administrator device 201, grants appropriate privileges using the grant container privilege command 206 through the centralized security database 153 that are required to run applications as software containers. When an end user requests to initiate a software container to a container runtime service 202 of the computing system, a check is first done with the centralized security database 153 to verify that the user has been given the appropriate privileges to start a container. If the user has been given the appropriate privileges, the software container is started by the container runtime service. Otherwise, the request is denied and the administrator has to grant the user permission to start the container or the user is prevented from starting the container.

For example, as shown in block 300, the method includes in response to a request 210 from a user to initiate a software container in a container runtime environment 202, accessing the centralized security database 153 that includes for one or more users, such as for usera 211, container privilege data 212 representing one or more container privileges for operations required to run applications in software containers on the computing system. In this example, the container privilege data 212 represents the privilege for the user to perform a plurality of operations that are to start or run a software container 203. As shown in block 302, the method includes verifying, such as by the user based container privilege verification module 107, that a user associated with the request 210 has been granted permission to initiate (e.g., start or run) a software container in the container runtime environment 202 based on the container privilege data 212 in the centralized security database. For example, the user based container privilege verification module 107 performs a check with the security manager database 153 as to whether a user has privileges to access certain operations of the software runtime service 202 needed to start a container.

In this example, the software container runtime environment 202 (also referred to as a container runtime service), provides an enterprise workflow platform to run cloud-native solutions. In this example, the software container runtime environment 202 makes system calls to the user based container privilege verification module 107. In this example the user based container privilege verification module 107 is implemented as part of an operating system 122, such as part of a UNIX OS kernel. However, it will be recognized that the user based container privilege verification module 107 may be integrated with any suitable component such as the security manager, or may be a standalone component if desired.

In one example, the software container runtime service 202 sends a privilege check request 220 to the user based container privilege verification module 107 that for example identifies a particular container operation. The user based container privilege verification module 107 issues a privilege check 222 in response to the privilege check request 220. This is performed within a user context so that the security manager knows the user identifier (ID) of the user, in other implementations a user ID may be provided in the request 210 so that the user ID is used as an index into the centralized secure database 153 to fetch the associated container privilege data 212 set for the user. The user based container privilege verification module 107 receives a reply 224 in response to the privilege check 222 that provides the fetched data 212. The container privilege data 212 indicates for example a yes or no as to whether the user has container privilege (e.g., privilege to run a container). If the user is identified as having the container privilege, the user based container privilege verification module 107 sends a response 226 to the software container runtime environment 202 indicating that the software container runtime environment 202 is authorized to access to the corresponding operation that was identified in the request 220. It will be recognized that the container privilege data 212 can be an overall privilege for those operations required to run applications in a container, or may be individual privilege indications on a per operation basis.

As shown in block 304, in response to verifying that the user has been granted permission to initiate the software container, the method includes starting the software container by permitting use of associated operations required to run applications in the software container. For example, the software container runtime service 202 carries out the operations needed to start the software container 203 and starts the container 203.

Figure 4:
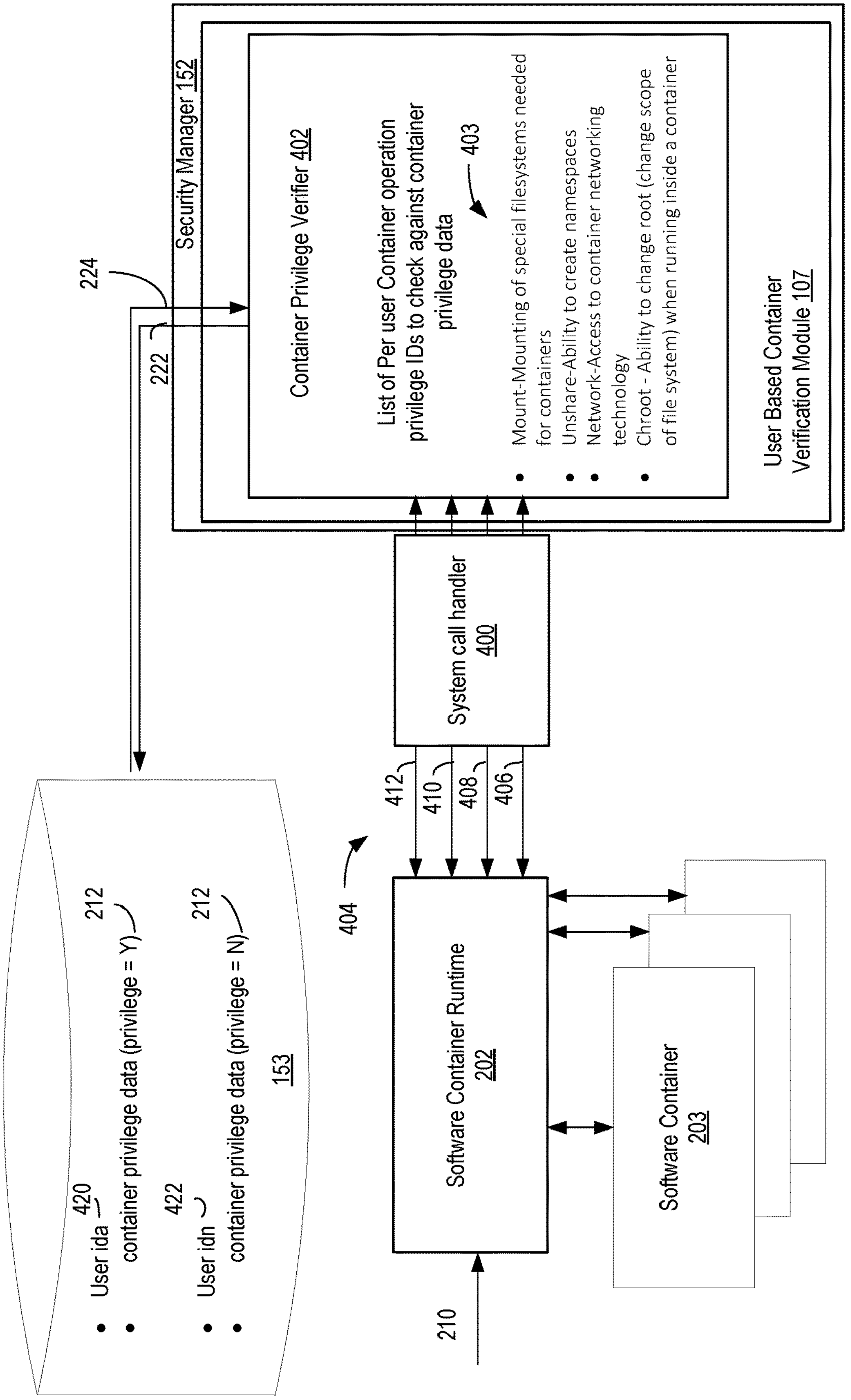
FIG. 4 sets forth a block diagram illustrating an example of a user based container verification module for providing privileged access to software containers according to aspects of the present disclosure.
Figure 5:
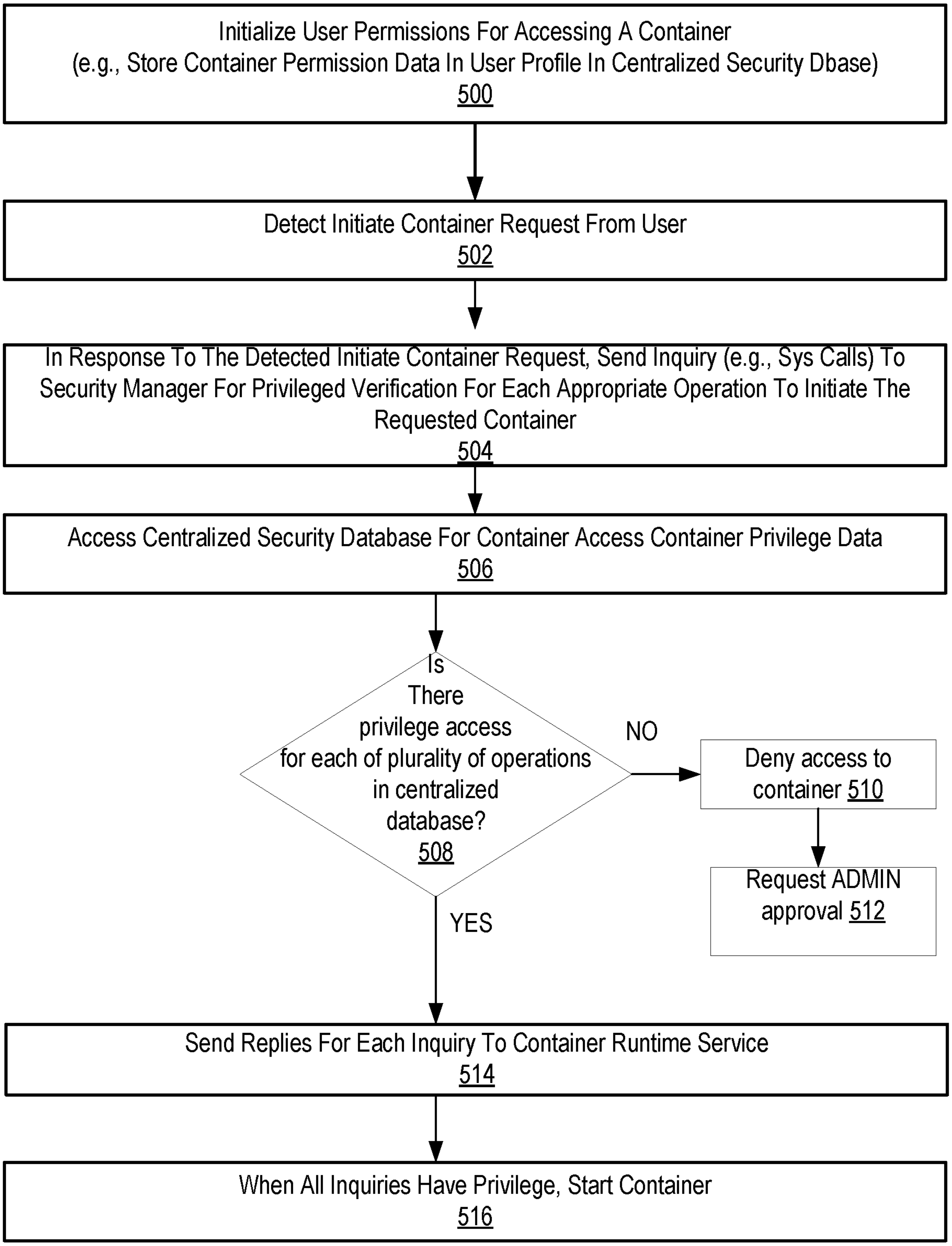
FIG. 5 sets forth a more detailed flowchart of an example process for providing privileged access to software containers according to aspects of the present disclosure according to aspects of the present disclosure.

Referring to FIG. 4 and FIG. 5, FIG. 4 sets forth a block diagram illustrating an example of a user based container privilege verification module for providing privileged access to software containers and FIG. 5 sets forth a corresponding flowchart of an example process for providing privileged access to software containers. In this example, the user based container verification module 107 includes executing code that operates as a container privilege verifier 402. A system call handler 400 handles system calls 404 with the software run container runtime environment 202. The container privilege verifier 402 in this example, stores policy data 403 such as data representing a list of container operation identifiers that identify those system calls that require a privilege check with the security manager database 153. In one example, the software container runtime environment 202 provides parameters in system calls that match with the list and indicate to the user based container privilege verification module 107 that a particular system call requires a privilege check through the security manager.

For example, there is an operating system call or command used by the software container runtime for each of the operations required to run applications in the software containers and a permission check is done with the centralized security database to verify that the user has the privilege to use the calls. Examples of calls associated with container operations include a mount command 406 for mounting of filesystems needed for containers, an unshare command 408 for an ability to create namespaces, a call 410 to establish a network connection, and a chroot command 412 for the ability to change root file system directories when running inside a container. One example of a network connection is the technology to provide usage of dynamic virtual IP addressing (DVIPA). The container privilege verifier determines when there is a match between calls 404 and policy data 403. When a match occurs, the container privilege verifier 402 checks the centralized security database 153 if the user has privilege to be granted the operations associated with a respective call.

Referring to FIG. 5, as shown in block 500, the method includes initializing user privileges for accessing containers. For example, the security manager provides an administrator interface that provides the data 212 representing one or more container privileges, for the centralized security database to grant container initiation privilege on a per user basis. The user interface sends the command 206 to the security manager and the security manager populates a user profile with the container privilege data 212 that represents a container use privilege, such as that the user can start containers. As shown in block 502 the method includes detecting the request 210 to initiate a container from a user. For example, the software container runtime environment 202 detects the request 210 that includes for example, container name to start. As shown in block 504, the method includes, in response to the detected request to initiate a container, send a system call, shown as calls 404, to the user based container privilege verification module 107 for each operation required to run the container. In one example, the container privilege verifier 402 detects that a call requires security privilege and checks if the user has container privileges for the respective call. In one example parameters in each of the calls indicates to the container privilege verifier 402 that a verification of user privileges is needed for a system call. In other examples, calls are matched to policy data 403 such as the list of calls to be verified and if a match occurs a request is sent to see if the user has container privilege data 212. The container privilege verifier 402 for example, verifies user privilege, based on the data 212 representing one or more container privileges in the centralized security database, for operations identified in each call. Any suitable number of operations can be used.

The container runtime service 202 calls the operating system 122, through the system call handler 400 in response to the request to initiate the software container. In this example the four calls 406-412 are made, each call corresponds to one of the operations required to run applications in the container. In this example there is a container call corresponding to a operation to mount, to create namespaces, to access networking technology of the system, and to change root of a file system (change scope of the filesystem) when running inside a container. As shown in block 504, in response to the initiate container request, the operating system provides the system calls from the container runtime service to the security manager. As shown in block 506, the method includes accessing the centralized security database 153 for container access privilege data by using the container privilege verifier 402 to send a request to pull the privilege permission data 212 for the user for each call. The container privilege verifier 402 verifies that the user associated with the request has been granted privilege to use each of a plurality of operations required to run applications in the software container, in response to the request to initiate the software container. For example, where the user is the user with user identifiera 420, the security manager database returns the container privilege data 212 which is Y indicating a yes that the use has privileges for the operation. If the user is the user with user identifier 422, the security manager database returns the container privilege data 212 which is N indicating that the user does not have privilege to use the container operation associated with the call. In one example, when the container privilege data 212 indicates a Y, the container privilege verifier 402 verifies that the user has privilege and send a response 226 to the call approving the call request.

As shown in block 508, the method includes verifying that the user associated with the request has been granted privilege to use each of a plurality of operations required to run applications in the software container, in response to the request to initiate the software container. For example, the container privilege verifier 402 checks that the privilege access is set for each of the operations namely for each of the calls 406-412. When the user does not have privilege to access an operation requested in the call, as shown in block 510 the user is denied access to initiate the container such as by container privilege verifier 402 sending a response to the call indicating that access to the operation is denied. The container privilege verifier 402 denies the user an ability to initiate the software container from container runtime service in response to a finding that the central security data base data 212 representing one or more container privileges does not grant privilege to use each of the plurality of operations required to run applications in the software container. As shown in block 512, when container initiation is denied for a user, in some implementations a notification is sent to notify an administrator that a user has been denied container access. Referring back to block 508 when all of the container operations requested through the calls have been verified that the user has privilege to access the container operations, as shown in block 514 the method includes in response to verifying that the user has been granted permission to initiate the software container, providing an indication of user privilege for the operations to the container runtime service. For example, the container privilege verifier 402 sends a response 226 that grants access to each operation that is called when the user has been confirmed as having privilege for the operation(s). As shown in block 516 the method includes when all calls have user privilege, the software container runtime service starts the container.

As set forth above, the user based container verification module verifies a user privilege for initiating a software container by the container runtime service, based on accessing the data in the centralized security database and the user based container verification module verifies user privilege for each of a plurality of operations required to run applications in a software container.

Among other technical benefits, using a single governance policy results in a simplified, global switch, that allows an administrator to give or restrict limited privileged access when running in containers. In some implementations, as part of an initial setup, a system administrator through a user interface provided on an administrator device, grants appropriate privileges through a centralized security database. In some examples, the granted privileges are for operations needed to run a container. When an end user requests to initiate a software container to a container runtime service of the computing system, a check is first done with the centralized security database to verify that the user has been given the appropriate privileges to start a container. If the user has been given the appropriate privileges, the software container is started by the container runtime service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

in response to a request to initiate a software container in a container runtime environment, accessing a centralized security database that comprises, for a user associated with the request, data representing a container use privilege granted on a per user basis for a plurality of operations used to start or run applications in the software containers on a computing system, wherein the container use privilege, when granted, authorizes the user to use each of the plurality of operations while running inside the software container and does not authorize the user associated with the request to use the plurality of operations while running outside of the software container, and wherein the container use privilege, when not granted, denies use of all of the plurality of operations;

verifying that the user associated with the request has been granted permission to initiate the software container based on the data representing the container use privilege identified in the centralized security database; and in response to verifying that the user has been granted permission to initiate the software container, starting the software container by permitting use of the plurality of operations to start or run applications in the software container, wherein the software container is started by a container runtime service that is separate from the centralized security database.

2. The method of claim 1 wherein in response to the request to initiate the software container, the method comprises verifying that the user associated with the request has been granted privilege to use each of a plurality of operations required to run applications in the software container.

3. The method of claim 2 wherein the data representing the container use privilege corresponds to a privilege associated with each of the plurality of operations including mounting of filesystems needed for containers, an ability to create namespaces, a network connection, and an ability to change root file system directories when running inside a container.

4. The method of claim 1 comprising providing access to the centralized security database, that comprises, for the user, the data representing the container use privilege based on a call from a container runtime service; and in response to verifying that the user has been granted permission to initiate the software container, providing an indication of user privilege for the operations to the container runtime service.

5. The method of claim 1 comprising denying the user an ability to initiate the software container in response to a finding that the data representing the container use privilege does not grant privilege to use each of the plurality of operations.

6. The method of claim 1 comprising providing an administrator interface that provides the data representing one or more container privileges, for the centralized security database to grant container initiation privilege on a per user basis.

7. The method of claim 1 comprising:

in response to the request to initiate the software container, calling, by a container runtime service, an operating system; and verifying, by the operating system, a user privilege for initiating the software container by the container runtime service, based on accessing the data in the centralized security database and verifying user privilege for each of the plurality of operations required to run applications in the software container.

8. An apparatus comprising:

a processing device; and memory operatively coupled to the processing device, wherein the memory stores computer program instructions that, when executed, cause the processing device to:

in response to a request to initiate a software container in a container runtime environment, accessing a centralized security database that comprises for a user associated with the request, data representing a container use privilege granted on a per user basis for a plurality of operations used to start or run applications in the software container on a computing system, wherein the container use privilege, when granted, authorizes the user to use each of the plurality of operations while running inside the software container and does not authorize the user associated with the request to use the plurality of operations while running outside of the software container, and wherein the container use privilege, when not granted, denies use of all of the plurality of operations;

verify that the user associated with the request has been granted permission to initiate the software container based on the data representing the container use privilege identified in the centralized security database; and in response to verifying that the user has been granted permission to initiate the software container, start the software container by permitting use of the plurality of operations to start or run applications in the software container.

9. The apparatus of claim 8 wherein the memory stores computer program instructions that, when executed, cause the processing device to:

verify that the user associated with the request has been granted privilege to use each of a plurality of operations required to run applications in the software container, in response to the request to initiate the software container.

10. The apparatus of claim 9 wherein the memory stores computer program instructions that, when executed, cause the processing device to:

verify user privilege, based on the data, wherein the data corresponds to a privilege associated with each of a plurality of operations including mounting of filesystems needed for containers, an ability to create namespaces, a network connection, and an ability to change root file system directories when running inside a container.

11. The apparatus of claim 8 wherein the memory stores computer program instructions that, when executed, cause the processing device to:

provide access to the centralized security database, that comprises the data based on a call from a container runtime service; and in response to verifying that the user has been granted permission to initiate the software container, provide an indication of user privilege for the operations to the container runtime service.

12. The apparatus of claim 8 wherein the memory stores computer program instructions that, when executed, cause the processing device to:

deny the user an ability to initiate the software container in response to a finding that the data does not grant privilege to use each of the plurality of operations required to run applications in the software container.

13. The apparatus of claim 8 wherein the memory stores computer program instructions that, when executed, cause the processing device to:

provide an administrator interface that provides the data, for the centralized security database to grant container initiation privilege on a per user basis.

14. The apparatus of claim 8 wherein the memory stores computer program instructions that, when executed, cause the processing device to provide a container runtime service and an operating system and to:

call, by the container runtime service, the operating system in response to the request to initiate the software container; and in response to the call, verify, by the operating system, a user privilege for initiating a software container by the container runtime service, based on accessing the data in the centralized security database and verifying user privilege for each of a plurality of operations required to run applications in a software container, wherein the software container is started by the container runtime service that is separate from the centralized security database.

15. A computer program product comprising a computer readable storage medium, wherein the computer readable storage medium comprises computer program instructions that, when executed cause one or more processing devices to:

provide a centralized security database, that comprises for a user associated with a request to initiate a software container in a container runtime environment, data representing a container use privilege granted on a per user basis for a plurality of operations used to start or run applications in the software container on a computing system, wherein the container use privilege, when granted, authorizes the user to use each of the plurality of operations while running inside the software container and does not authorize the user associated with the request to use the plurality of operations while running outside of the software container;

in response to a request to initiate a software container in a container runtime environment, access the centralized security database;

verify that the user has been granted permission to initiate the software container based on the data; and in response to verifying that the user has been granted permission to initiate the software container, start the software container by permitting use of the plurality of operations to start or run applications in the software container.

16. The computer program product of claim 15 wherein the computer readable storage medium comprises computer program instructions that, when executed:

verify that the user associated with the request has been granted privilege to use each of a plurality of operations required to run applications in the software container, in response to the request to initiate the software container.

17. The computer program product of claim 16 wherein the computer readable storage medium comprises computer program instructions that, when executed:

verify user privilege, based on the data representing one or more container privileges in the centralized security database, for operations required to run applications in the software containers wherein the data corresponds to a privilege associated with each of a plurality of operations including mounting of filesystems needed for containers, an ability to create namespaces, a network connection, and an ability to change root file system directories when running inside a container.

18. The computer program product of claim 15 wherein the computer readable storage medium comprises computer program instructions that, when executed:

provide access to the centralized security database, that comprises for at least one user, the data representing one or more container privileges based on a call from a container runtime service; and in response to verifying that the user has been granted permission to initiate the software container, providing an indication of user privilege for the operations to the container runtime service.

19. The computer program product of claim 16 wherein the computer readable storage medium comprises computer program instructions that, when executed:

deny the user an ability to initiate the software container in response to a finding that the data representing one or more container privileges does not grant privilege to use each of the plurality of operations required to run applications in the software container.

20. The computer program product of claim 15 wherein the computer readable storage medium comprises computer program instructions that, when executed:

call an operating system in response to the request to initiate the software container; and in response to the call verify, by the operating system, a user privilege for initiating a software container by a container runtime service, based on accessing the data in the centralized security database and verifying user privilege for each of a plurality of operations required to run applications in a software container.

* * * * *